United States Patent
Watanabe et al.

(10) Patent No.: US 9,457,776 B2
(45) Date of Patent: Oct. 4, 2016

(54) BRAKE CONTROL DEVICE AND BRAKE CONTROL METHOD

(71) Applicants: Mitsubishi Electric Corporation, Chiyoda-ku (JP); CENTRAL JAPAN RAILWAY COMPANY, Nagoya-shi (JP); MITSUBISHI HEAVY INDUSTRIES, LTD., Minato-ku (JP)

(72) Inventors: Tomoki Watanabe, Chiyoda-ku (JP); Yoshiya Watanabe, Nagoya-shi (JP); Takahisa Inui, Minato-ku (JP)

(73) Assignees: MITSUBISHI ELECTRIC CORPORATION, Chiyoda-Ku, Tokyo (JP); CENTRAL JAPAN RAILWAY COMPANY, Nagoya-Shi, Aichi (JP); MITSUBISHI HEAVY INDUSTRIES, LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/260,738

(22) Filed: Apr. 24, 2014

(65) Prior Publication Data

US 2014/0319904 A1    Oct. 30, 2014

(30) Foreign Application Priority Data

Apr. 26, 2013  (JP) ................. 2013-094549

(51) Int. Cl.
*B60T 8/176*  (2006.01)
*B60T 13/68*  (2006.01)
*B60T 13/66*  (2006.01)
*B60T 8/32*  (2006.01)
(Continued)

(52) U.S. Cl.
CPC .............. *B60T 8/176* (2013.01); *B60T 8/3235* (2013.01); *B60T 13/662* (2013.01); *B60T 13/665* (2013.01); *B60T 13/683* (2013.01); *B60T 17/228* (2013.01); *B60T 8/5012* (2013.01); *B60T 8/5081* (2013.01)

(58) Field of Classification Search
CPC .. B60T 13/662; B60T 13/665; B60T 13/683; B60T 17/228; B60T 8/176; B60T 8/3235; B60T 8/5012; B60T 8/5081; B60T 8/1705; B60T 8/342; B60T 8/362; B60T 8/38; B60T 15/027

USPC ....................................... 303/119.1
See application file for complete search history.

(56) References Cited

U.S. PATENT DOCUMENTS 3,093,399 A * 6/1963 Smith ................... B61C 15/107
                                                                 172/439
5,494,342 A * 2/1996 Engle .................... B60T 13/665
                                                                 303/15
(Continued)

FOREIGN PATENT DOCUMENTS

CN         1332678 A     1/2002
CN       102099233 A     6/2011
(Continued)

OTHER PUBLICATIONS

Office Action issued by the Canadian Patent Office on Jul. 9, 2015 in corresponding Canadian Application No. 2,849,851 (3 pages).
(Continued)

*Primary Examiner* — Robert A Siconolfi
*Assistant Examiner* — San Aung
(74) *Attorney, Agent, or Firm* — Buchanan Ingersoll & Rooney PC

(57) ABSTRACT

In brake control based on commands of a plurality of systems, an adjustment valve adjusts fluid supplied from a fluid source to a predetermined pressure to output the pressure-adjusted fluid. An output valve switches opening and closing based on a switching command. A skid detector detects whether a car is skidding or not and notifies a brake controller. The brake controller determines a pressure of fluid output by a control valve and issues a command to solenoid valves provided in the control valve. The brake controller issues a command to a discharge valve to discharge fluid from the discharge valve when a skid is detected. A relay valve adjusts pressure of fluid from the fluid source based on a higher pressure between a pressure of fluid output by the output valve and a pressure of fluid output by the control valve, to output the pressure-adjusted air to a brake cylinder.

2 Claims, 4 Drawing Sheets

(51) Int. Cl.
*B60T 17/22* (2006.01)
*B60T 8/50* (2006.01)

(56) References Cited

U.S. PATENT DOCUMENTS

| | | | |
|---|---|---|---|
| 5,775,367 A | 7/1998 | Yamaguchi et al. | |
| 6,669,308 B1* | 12/2003 | Aurich | B60T 8/1893 303/15 |
| 7,226,135 B2* | 6/2007 | Barberis | B60T 8/3235 303/15 |
| 2004/0046442 A1 | 3/2004 | Aurich et al. | |
| 2007/0173990 A1* | 7/2007 | Smith | B61C 15/14 701/20 |
| 2007/0236077 A1* | 10/2007 | Schweikert | B60T 8/1893 303/7 |
| 2011/0089755 A1 | 4/2011 | Itano et al. | |

FOREIGN PATENT DOCUMENTS

| | | |
|---|---|---|
| JP | 8-290765 A | 11/1996 |
| JP | 2001-018784 A | 1/2001 |
| JP | 2005-289172 A | 10/2005 |
| JP | 2010-125875 A | 6/2010 |
| KR | 2011-0014218 A | 2/2011 |

OTHER PUBLICATIONS

Office Action issued by the Korean Patent Office on Apr. 29, 2015 in corresponding Korean Application No. 10-2014-0048764, and English language translation of Office Action (7 pages).
Office Action issued by the Japan Patent Office on Jun. 2, 2015 in corresponding Japanese Application No. 2013-094549, and English language translation of Office Action (5 pages).
Office Action issued by the Canadian Patent Office on Feb. 29, 2016 in corresponding Canadian Application No. 2,849,851 (3 pages).
Office Action issued by the Chinese Patent Office on Dec. 22, 2015 in corresponding Chinese Application No. 201410172421.2, and partial English language translation of Office Action (8 pages).
Office Action issued by the Korean Patent Office on Nov. 27, 2015 in corresponding Korean Application No. 10-2014-0048764, and English language translation of Office Action (7 pages).

* cited by examiner

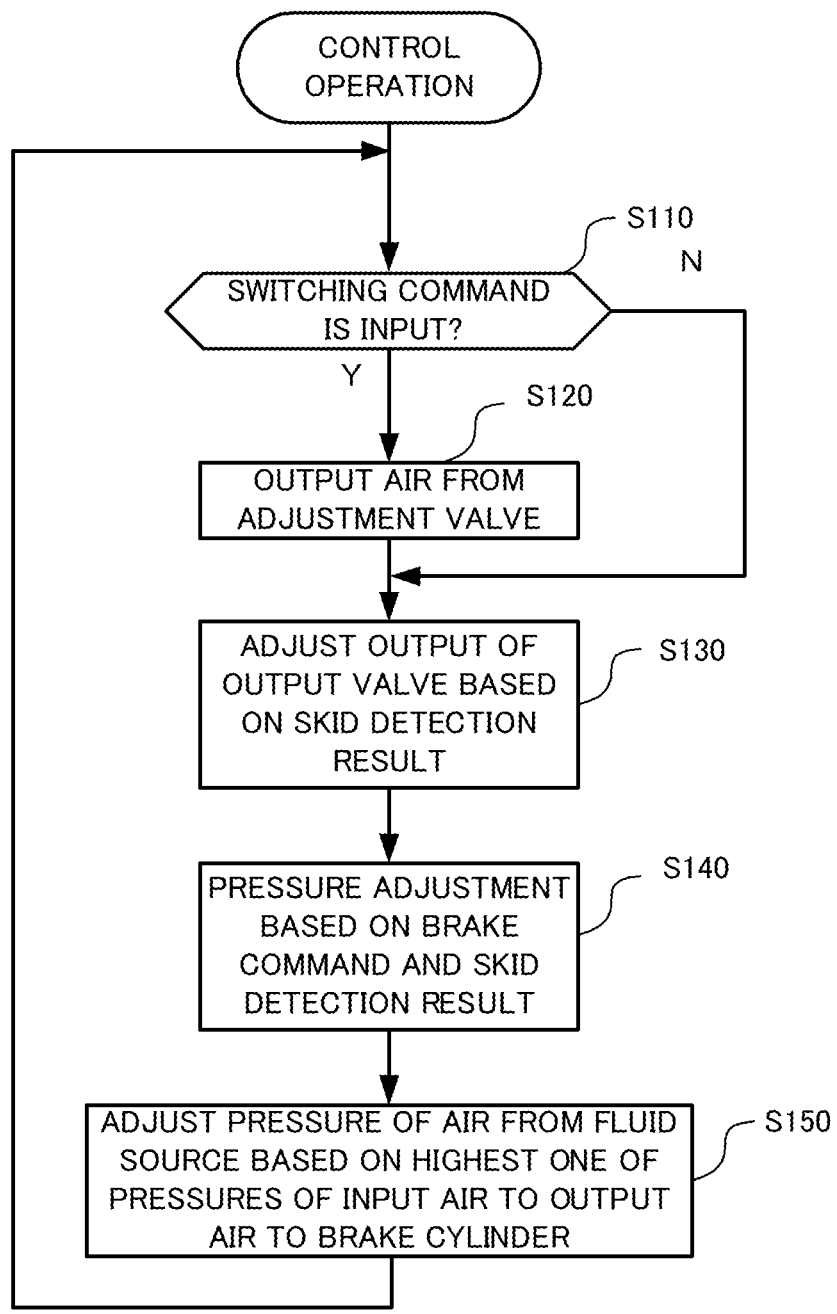

BRAKE CONTROL DEVICE AND BRAKE CONTROL METHOD

CROSS-REFERENCE TO RELATED APPLICATION

This application claims the benefit of Japanese Patent Application No. 2013-94549, filed on Apr. 26, 2013, the entire disclosure of which is incorporated by reference herein.

FIELD

This application relates to a brake control device and a brake control method.

BACKGROUND

In a brake control device of a rail car, from a fail-safe point of view, commands of a plurality of systems are input to the brake control device. Based on any one of the commands, a relay valve adjusts, for example, air pressure from an air source and output the pressure-adjusted air to a brake cylinder, whereby a brake of a rail car can be controlled based on the commands of a plurality of systems.

In an air brake device of an electric rolling stock disclosed in Unexamined Japanese Patent Application Kokai Publication No. 2001-18784 and a brake control device used for a rail car disclosed in Unexamined Japanese Patent Application Kokai Publication No. H8-290765, when a skid of a car is detected, skid control is performed to control a pressure of air output by a relay valve using a solenoid valve.

A solenoid valve controlling an output of a relay valve is larger than a solenoid valve controlling a command pressure input to the relay valve. In the air brake device of an electric rolling stock disclosed in Unexamined Japanese Patent Application Kokai Publication No. 2001-18784 and the brake control device used for a rail car disclosed in Unexamined Japanese Patent Application Kokai Publication No. H8-290765, since a solenoid valve provided for skid control by an output of the relay valve is large, an enlarged device size has been a problem. Further, there is a brake control device performing control in such a manner that command pressures of two systems are provided for a relay valve, and air on a higher-level priority basis, in other words, air based on a higher command pressure in the relay valve is output to a brake cylinder. In the relay valve of this brake control device, regardless of a magnitude relationship between the command pressures of two systems, when brake control and skid control are performed, it is necessary to provide a solenoid valve for skid control for each of the plurality of command pressures. Accordingly, the device size is enlarged.

SUMMARY

The present invention is invented in view of the above circumstances and an exemplary object of the present invention is to ensure higher-level priority and simplify a configuration for performing skid control in brake control based on commands of a plurality of systems.

To achieve the object, a brake control device of the present invention includes a fluid source that is a supply source of fluid, a skid detector, an adjustment valve, an output valve, a discharge valve, a control valve, and a relay valve. The skid detector detects a skid of a car. The adjustment valve adjusts a pressure of the fluid supplied from the fluid source to a predetermined pressure and output the thus-adjusted fluid. The output valve outputs the fluid output by the adjustment valve when the fluid output by the adjustment valve is input and a switching command is input, and does not output the fluid output by the adjustment valve when no switching command is input. The discharge valve depressurizes an output by the output valve based on a detection result of the skid detector. The control valve adjusts, based on a brake command and the detection result of the skid detector, a pressure of the fluid supplied from the fluid source to output the pressure-adjusted fluid. The relay valve adjusts, based on a higher pressure between pressures of the fluid output by the output valve and pressures of the fluid output by the control valve, a pressure of the fluid supplied from the fluid source to output the pressure-adjusted fluid to a brake cylinder.

According to the present invention, in the brake control based on commands of a plurality of systems, higher-level priority can be ensured and a configuration for performing skid control can be simplified.

BRIEF DESCRIPTION OF THE DRAWINGS

A more complete understanding of this application can be obtained when the following detailed description is considered in conjunction with the following drawings, in which:

FIG. 3 is a flowchart illustrating one example of a control operation performed by the brake control device according to the embodiment.

DETAILED DESCRIPTION

The embodiment of the present invention will now be described in detail with reference to the accompanying drawings. In the figures, the same signs will be assigned to the same or equivalent parts.

Figure 1:
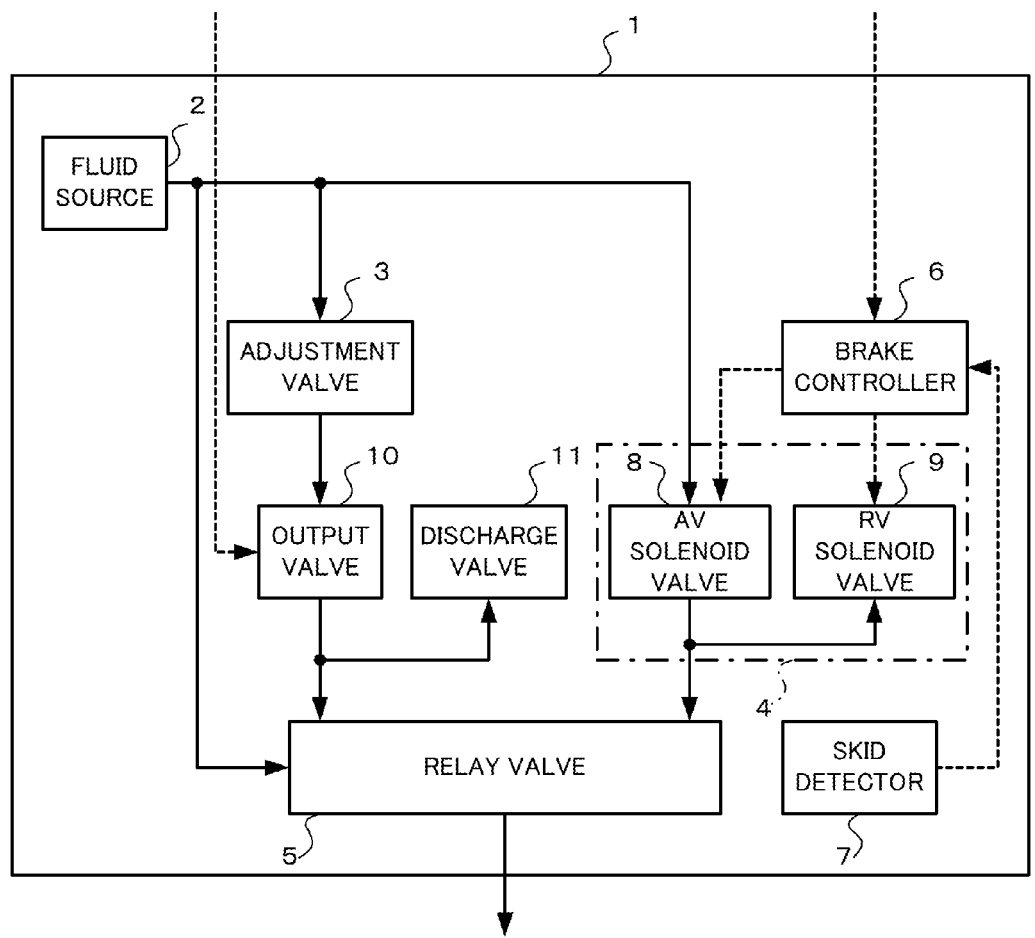
FIG. 1 is a block diagram illustrating a configurational example of a brake control device according to an embodiment of the present invention.

FIG. 1 is a block diagram illustrating a configurational example of the brake control device according to the embodiment of the present invention. A brake control device 1 according to the embodiment supplies pressure-adjusted fluid to a brake cylinder, thereby performing brake control of an electric rolling stock. Examples of the fluid include air and oil. In the present embodiment, air is used as the fluid. The brake control device 1 includes a fluid source 2, an adjustment valve 3, a control valve 4, a relay valve 5, a brake controller 6, a skid detector 7, an output valve 10, and a discharge valve 11. The control valve 4 includes an AV solenoid valve 8 that is a solenoid valve for supplying air and an RV solenoid valve 9 that is a solenoid valve for discharging air. The brake control device 1 is disposed, for example, in an electric rolling stock to adjust air pressure supplied by the fluid source 2 and then sends the pressure-adjusted air to the brake cylinder.

The adjustment valve 3 adjusts air supplied from the fluid source 2 to a predetermined pressure to output the pressure-adjusted air. A pressure of air output by the adjustment valve 3 is constant. The air output by the adjustment valve 3 and a switching command as illustrated by a dotted line in FIG. 1 are input to the output valve 10. The switching command refers, for example, to a command from a motorman's cab or a command from another car-mounted device such as an Automatic Train Control (ATC) and the like, which is a command for causing an emergency brake or an auxiliary brake to operate. The output valve 10 switches opening and closing based on a switching command, and outputs air output by the adjustment valve 3 when a switching command is input, and does not output the air output by the adjustment valve 3 when no switching command is input.

The skid detector 7 detects whether a car including the brake control device 1 is skidding or not. The skid detector 7 detects occurrence of a skid, for example, when a shaft speed of an axle is less than a reference shaft speed by at least a certain value to notify the brake controller 6 of the detected skid. The certain value refers to an optional value determined by design. Further, for example, when detecting that a shaft speed of an axle has started increasing after occurrence of a skid, the skid detector 7 considers the wheels to have re-adhered to the rail, and then notifies the brake controller 6.

In addition to a notice from the skid detector 7, for example, a brake command from the motorman's cab is input to the brake controller 6 as illustrated by a dotted line in FIG. 1. The brake controller 6 issues commands to the AV solenoid valve 8, the RV solenoid valve 9, and the discharge valve 11 based on the brake command and the detection result of the skid detector 7. The brake controller 6 issues commands to the AV solenoid valve 8 and the RV solenoid valve 9 so as to obtain a necessary brake force based on the brake command. For example, when the skid detector 7 has detected a skid, in order to reduce a pressure of air output by the control valve 4, the brake controller 6 issues a command to the AV solenoid valve 8 so as not to supply air from the AV solenoid valve 8 and issues a command to the RV solenoid valve 9 so as to discharge air from the RV solenoid valve 9. Further, when the skid detector 7 has detected the skid, in order to reduce a pressure of air output by the output valve 10, the brake controller 6 issues a command to the discharge valve 11 so as to discharge air from the discharge valve 11.

Thereafter, when the skid detector 7 has detected wheel re-adhesion, in order to obtain a necessary brake force based on a brake command, the brake controller 6 issues a command to the AV solenoid valve 8 so as to supply air from the AV solenoid valve 8 and issues a command to the RV solenoid valve 9 so as not to discharge air from the RV solenoid valve 9. Further, when the skid detector 7 has detected the wheel re-adhesion, in order to match a pressure of air output by the output valve 10 with a pressure of air output by the adjustment valve 3, the brake controller 6 issues a command to the discharge valve 11 so as not to discharge air from the discharge valve 11.

Air is supplied from the fluid source 2 to the AV solenoid valve 8. Then, air pressure-adjusted by the AV solenoid valve 8 and the RV solenoid valve 9 is sent to the relay valve 5. A pressure of air output by the output valve 10 is controlled by the discharge valve 11 to send the pressure-controlled air to the relay valve 5.

The relay valve 5 adjusts a pressure of air supplied from the fluid source 2 based on a higher pressure between a pressure of air output by the output valve 10 controlled by the discharge valve 11 and a pressure of air output by the control valve 4 to output the pressure-adjusted air to the brake cylinder. In the example of FIG. 1, the relay valve 5 adjusts a pressure of air supplied from the fluid source 2 based on a higher one of a pressure of air output by the output valve 10 controlled by the discharge valve 11 and a pressure of air output by the control valve 4 to output the pressure-adjusted air to the brake cylinder.

Figure 2A:
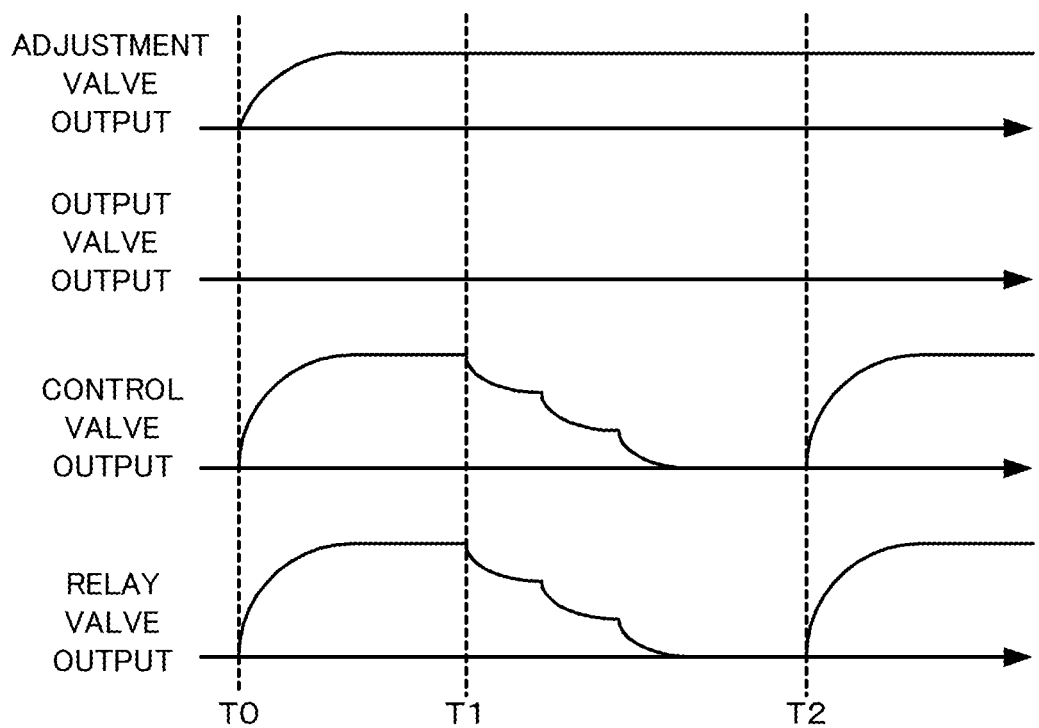
FIG. 2A is a chart illustrating changes in pressure during skid control in a case where no switching command is input, in the brake control device according to the embodiment.
Figure 2B:
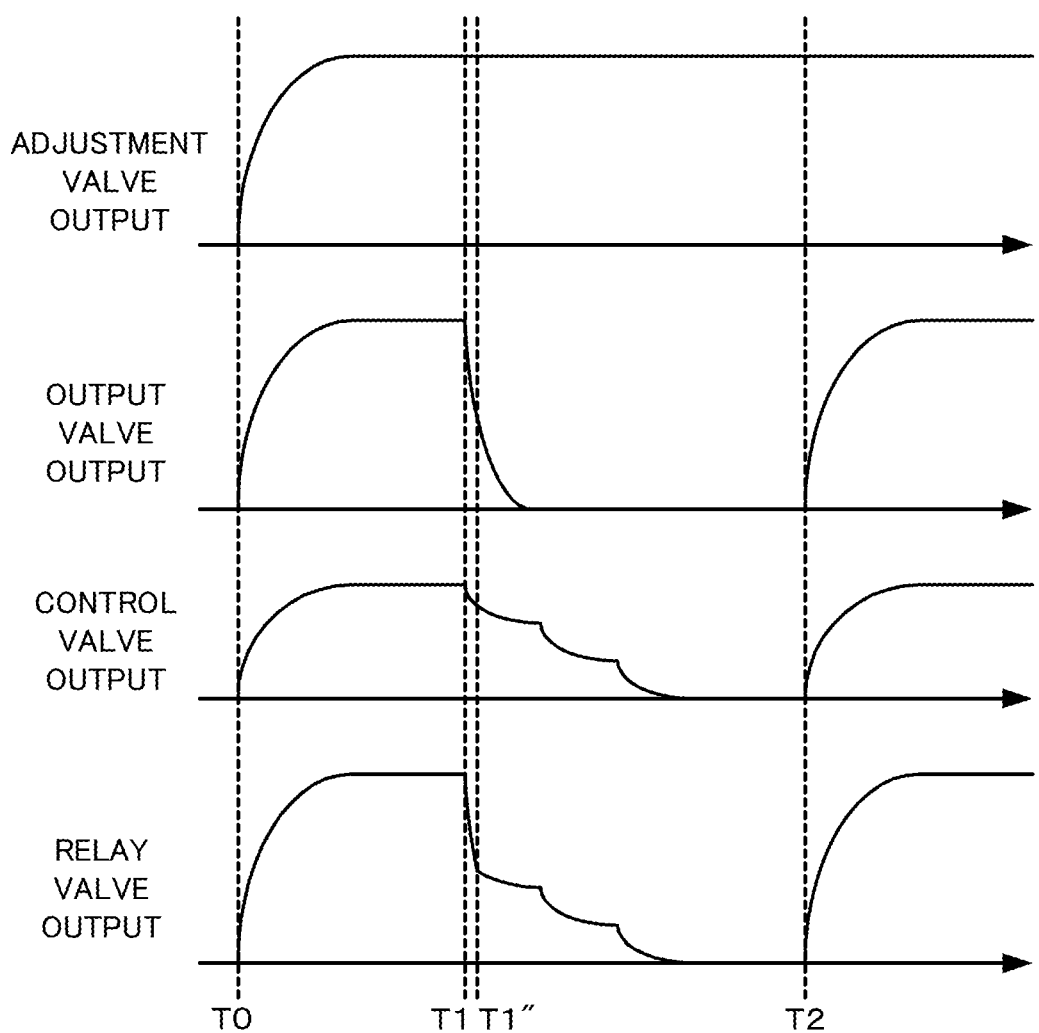
FIG. 2B is a chart illustrating changes in pressure during skid control in a case where a switching command is input, in the brake control device according to the embodiment.

FIGS. 2A and 2B are charts illustrating changes in pressure during skid control in the brake control device according to the embodiment. The horizontal axis indicates time and the vertical axis indicates a pressure of air output by each valve. Description will be made on an example, in which a brake command is input at a time T0, a skid is detected by the skid detector 7 at a time T1, and wheel re-adhesion is detected by the skid detector 7 at a time T2. FIG. 2A illustrates a case where no switching command is input and FIG. 2B illustrates a case where a switching command is input.

As illustrated in FIG. 2A, when no switching command is input, the output valve 10 does not output air output by the adjustment valve 3. In other words, an output of the adjustment valve 3 illustrated in a first stage is not output from the output valve 10 to the relay valve 5 as illustrated in a second stage. The control valve 4 controls air supplied from the fluid source 2 based on a command from the brake controller 6 and outputs the thus-controlled air. A pressure of air output by the control valve 4 is gradually increased after a brake command is input at the time T0 as illustrated in a third stage, and then held at a certain value. Thereafter, when a skid is detected at the time T1, a pressure of air output by the control valve 4 is gradually decreased in accordance with a command from the brake controller 6. When wheel re-adhesion is detected at the time T2, a pressure of air output by the control valve 4 is increased again and then held at a certain value. As illustrated in a fourth stage of FIG. 2A, the relay valve 5 adjusts a pressure of air supplied from the fluid source 2 to output the pressure-adjusted air to the brake cylinder, based on a higher one of a pressure of air output by the output valve 10 and a pressure of air output by the control valve 4, in other words, based on a pressure of air output by the control valve 4 in the case of FIG. 2A.

As illustrated in FIG. 2B, when a switching command is input, the output valve 10 outputs air output by the adjustment valve 3. In other words, an output of the adjustment valve 3 illustrated in the first stage is output from the output valve 10 to the relay valve 5. The discharge valve 11 controls air output by the output valve 10 based on a command from the brake controller 6. When a skid is detected at the time T1, the discharge valve 11 discharges air output by the output valve 10 in accordance with the command from the brake controller 6. As illustrated in the second stage, a pressure of air output by the output valve 10 adjusted by the discharge valve 11 is the same as an output of the adjustment valve 3 illustrated in the first stage of FIG. 2B until the time T1. However, the pressure is decreased when a discharge from the discharge valve 11 is initiated at the time T1. Thereafter, when wheel re-adhesion is detected at the time T2, the discharge valve 11 stops discharging air output by the output valve 10 in accordance with a command from the brake controller 6. As illustrated in the second stage, a pressure of air output by the output valve 10 adjusted by the discharge valve 11 is increased again from the time T2 and then held at a certain value.

The control valve 4 adjusts a pressure of air supplied from the fluid source 2 based on a command from the brake controller 6 to output the pressure-adjusted air. An output of the control valve 4 is the same as in the case of FIG. 2A. As illustrated in a fourth stage of FIG. 2B, the relay valve 5 adjusts a pressure of air supplied from the fluid source 2 based on a higher one of a pressure of air output by the output valve 10 adjusted by the discharge valve 11 and a pressure of air output by the control valve 4 to output the pressure-adjusted air to the brake cylinder. In the case of FIG. 2B, from the time T0 until a time T1' and after the time T2, a pressure of air output by the control valve 4 is less than a pressure of air output by the output valve 10. Therefore, the relay valve 5 adjusts a pressure of air supplied from the fluid source 2 based on an output of the output valve 10 from the time T0 until the time T1' and after the time T2, and adjusts the pressure of air supplied from the fluid source 2 based on an output of the control valve 4 from the time T1' until the time T2 to output the pressure-adjusted air to the brake cylinder. Even when an output of the adjustment valve 3 is greater than an output of the control valve 4, during skid detection, air is discharged from the discharge valve 11 to adjust a pressure of air output by the output valve 10 to enable skid control.

As illustrated in FIG. 2A and FIG. 2B, when the control valve 4 is controlled by a detection result of the skid controller 7 and the discharge valve 11 is disposed on the output valve 10 side, in brake control based on commands of a plurality of systems, skid control can be performed regardless of a magnitude relationship among command pressures of a plurality of systems, even without providing skid control processing for each command pressure.

FIG. 3 is a flowchart illustrating one example of a control operation performed by the brake control device according to the embodiment. When a switching command is input (step S110; Y), the output valve 10 outputs air that was output by the adjustment valve 3 to the relay valve 5 (step S120). When no switching command is input (step S110; N), without performing step S120, the output valve 10 does not output air output by the adjustment valve 3 to the relay valve 5.

The discharge valve 11 discharges air output by the output valve 10 when a skid is detected, based on a command from the brake controller 6 according to a brake command and a detection result of the skid detector 7, and thereafter stops discharging the air output by the output valve 10 when re-adhesion is detected to adjust an output of the output valve 10 (step S130). The control valve 4 adjusts a pressure of input air to output the pressure-adjusted air, based on the command from the brake controller 6 according to the brake command and the detection result of the skid detector 7 (step S140). The relay valve 5 adjusts a pressure of air supplied from the fluid source 2 based on a higher pressure between a pressure of air output by the output valve 10 and a pressure of air output by the control valve 4 to output the pressure-adjusted air to the brake cylinder (step S150).

In the brake control device 1 according to the embodiment, in brake control based on a plurality of commands that are a brake command and a switching command, skid control can be performed. Further, it is not necessary to provide a solenoid valve between the relay valve 5 and the brake cylinder, and therefore, the size of the brake control device 1 can be made smaller. Moreover, the relay valve 5 makes it possible to realize higher-level priority control, in which a pressure of air from the fluid source 2 is adjusted based on a higher pressure between the pressures of input air and the pressure-adjusted air is output to the brake cylinder. Further, discharging of air output by the output valve 10 from the discharge valve 11 during skid detection makes it possible to realize skid control while higher-level priority control is performed in the relay valve 5, regardless of a magnitude relationship between an output of the output valve 10 and an output of the control valve 4. In addition, a configuration where the skid detector 7 is disposed only on the control valve 4 side simplifies the configuration of the device.

As has been described above, according to the brake control device 1 of the embodiment, in brake control based on commands of a plurality of systems, it is possible to simplify a configuration for performing skid control and to perform skid control regardless of a magnitude relationship among command pressures of a plurality of systems.

The embodiment of the present invention is not limited to the aforementioned embodiment. The number of command pressure systems is not limited to two, and the brake control device 1 may include, for example, a plurality of control valves 4 that are controlled based on different brake commands, or a plurality of adjustment valves 3 and a plurality of output valves 10 that are controlled based on different switching commands.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A brake control device comprising:
   a fluid source that is a supply source of fluid;
   a skid detector detecting a skid of a car;
   an adjustment valve adjusting a pressure of the fluid supplied from the fluid source to a predetermined pressure and outputting pressure-adjusted fluid;
   an output valve receiving the fluid output by the adjustment valve, the output valve outputting the fluid output by the adjustment valve when a switching command is input and not outputting the fluid output by the adjustment valve when the switching command is not input;
   a discharge valve depressurizing an output by the output valve based on a detection result of the skid detector;
   a control valve adjusting a pressure of the fluid supplied from the fluid source based on a brake command and the detection result of the skid detector to output the pressure-adjusted fluid; and
   a relay valve adjusting a pressure of the fluid supplied from the fluid source based on a higher pressure between a pressure of the fluid output by the output valve and a pressure of the fluid output by the control valve to output the pressure-adjusted fluid to a brake cylinder.

2. A brake control method performed by a brake control device comprising a fluid source that is a supply source of fluid, the brake control method comprising:
   a skid detection step of detecting a skid of a car;
   an adjustment step of adjusting a pressure of the fluid supplied from the fluid source to a predetermined pressure to output pressure-adjusted fluid;
   an output step of receiving the fluid output in the adjustment step, outputting the fluid output in the adjustment step when a switching command is input, and not outputting the fluid output in the adjustment step when the switching command is not input;
   a discharge step of depressurizing an output in the output step based on a detection result in the skid detection step;
   a control step of adjusting a pressure of the fluid supplied from the fluid source based on a brake command and the detection result in the skid detection step to output the pressure-adjusted fluid; and a relay step of adjusting a pressure of the fluid supplied from the fluid source based on a higher pressure between a pressure of the fluid output in the output step and a pressure of the fluid output in the control step to output the pressure-adjusted fluid to a brake cylinder.

* * * * *